United States Patent
Ando et al.

(10) Patent No.: US 9,656,170 B2
(45) Date of Patent: May 23, 2017

(54) GAME APPARATUS

(71) Applicant: KABUSHIKI KAISHA SQUARE ENIX, Tokyo (JP)

(72) Inventors: Takehiro Ando, Tokyo (JP); Hiroaki Iwano, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 754 days.

(21) Appl. No.: 13/929,035

(22) Filed: Jun. 27, 2013

(65) Prior Publication Data

US 2014/0011585 A1    Jan. 9, 2014

(30) Foreign Application Priority Data

Jul. 3, 2012    (JP) ................. 2012-149942

(51) Int. Cl.
*A63F 13/537*    (2014.01)
*A63F 13/822*    (2014.01)
(Continued)

(52) U.S. Cl.
CPC .............. *A63F 13/58* (2014.09); *A63F 13/10* (2013.01); *A63F 13/42* (2014.09); *A63F 13/833* (2014.09);
(Continued)

(58) Field of Classification Search
CPC .. A63F 13/537; A63F 13/822; A63F 2300/65; A63F 2300/807
(Continued)

(56) References Cited

U.S. PATENT DOCUMENTS

| | | | |
|---|---|---|---|
| 5,435,554 A * | 7/1995 | Lipson | A63F 13/10 463/3 |
| 6,210,273 B1 * | 4/2001 | Matsuno | A63F 13/10 463/31 |

(Continued)

FOREIGN PATENT DOCUMENTS

| | | |
|---|---|---|
| JP | 2007-300973 | 11/2007 |
| JP | 2009-240659 | 10/2009 |

OTHER PUBLICATIONS

"Shadow Hearts FAQ Walkthrough" by Georgi Samaras, published Sep. 15, 2009. Source http://www.gamefaqs.com/ps2/459510-shadow-hearts/faqs/47343.*

(Continued)

*Primary Examiner* — Steven J Hylinski
(74) *Attorney, Agent, or Firm* — Greenblum & Bernstein, P.L.C.

(57) ABSTRACT

The present invention provides a game apparatus in which the variation width of a computation result in a battle between a player character and an enemy character is increased, and a difference in result can be brought about even with the same attack by a player's operation, and furthermore, a player can play a game while he/she feels the sense of realism and tension where he/she manipulates the character that is difficult to manipulate as intended. A chain used by a main character to manipulate a dragon is displayed on a display screen. A player manipulates the dragon by loosening or tightening the chain by performing an operation on a touch panel. The control level of the dragon is represented by an uncontrollability parameter. A status such as the offensive power of the dragon changes according to the uncontrollability parameter.

14 Claims, 9 Drawing Sheets

(51) Int. Cl.
*A63F 13/58* (2014.01)
*A63F 13/40* (2014.01)
A63F 13/42 (2014.01)
A63F 13/833 (2014.01)

(52) U.S. Cl.
CPC ... *A63F 2300/65* (2013.01); *A63F 2300/8029* (2013.01)

(58) Field of Classification Search
USPC .......................................................... 463/7–8
See application file for complete search history.

(56) References Cited

U.S. PATENT DOCUMENTS

| | | | | |
|---|---|---|---|---|
| 6,347,993 | B1* | 2/2002 | Kondo | A63F 13/10 434/167 |
| 6,439,998 | B1* | 8/2002 | Itou | A63F 13/005 463/23 |
| 6,533,663 | B1* | 3/2003 | Iwao | A63F 13/10 463/30 |
| 6,626,756 | B2* | 9/2003 | Sugimoto | A63F 13/10 463/1 |
| 7,470,193 | B2* | 12/2008 | Umezaki | A63F 13/10 463/1 |
| 7,549,918 | B2* | 6/2009 | Kang | A63F 13/10 463/2 |
| 7,896,733 | B2* | 3/2011 | Tanabe | A63F 13/10 463/2 |
| 8,012,007 | B2 | 9/2011 | Yoshida | |
| 8,187,094 | B2* | 5/2012 | Sawada | A63F 13/10 463/36 |
| 8,469,819 | B2* | 6/2013 | McMain | A63F 13/10 463/1 |
| 2002/0142848 | A1* | 10/2002 | Tsuchida | A63F 13/10 463/43 |
| 2003/0207712 | A1* | 11/2003 | Sterchi | A63F 13/10 463/23 |
| 2004/0029626 | A1* | 2/2004 | Annunziata | A63F 13/10 463/1 |
| 2004/0143852 | A1* | 7/2004 | Meyers | A63F 13/12 725/133 |
| 2004/0214623 | A1* | 10/2004 | Takahashi | A63F 13/10 463/2 |
| 2005/0282624 | A1* | 12/2005 | Kane | A63F 13/12 463/25 |
| 2006/0030384 | A1* | 2/2006 | Yoshizawa | G07F 17/3209 463/7 |
| 2006/0058101 | A1* | 3/2006 | Rigopulos | A63F 13/10 463/35 |
| 2006/0183521 | A1* | 8/2006 | Hamamoto | A63F 13/10 463/8 |
| 2007/0032282 | A1* | 2/2007 | Hamamoto | A63F 13/10 463/9 |
| 2007/0225073 | A1* | 9/2007 | Ishii | A63F 13/10 463/31 |
| 2007/0234885 | A1* | 10/2007 | Schmidt | G10H 1/342 84/722 |
| 2007/0265089 | A1* | 11/2007 | Robarts | A63F 13/12 463/42 |
| 2007/0270222 | A1 | 11/2007 | Yamanaka et al. | |
| 2008/0070655 | A1* | 3/2008 | Tanabe | A63F 13/10 463/7 |
| 2008/0113698 | A1* | 5/2008 | Egozy | A63F 13/12 463/7 |
| 2008/0119268 | A1* | 5/2008 | Kando | A63F 13/00 463/31 |
| 2008/0188305 | A1* | 8/2008 | Yamazaki | A63F 13/06 463/36 |
| 2008/0207331 | A1* | 8/2008 | Beale | G06N 3/004 463/42 |
| 2009/0258704 | A1* | 10/2009 | Asami | A63F 13/02 463/36 |
| 2010/0009750 | A1* | 1/2010 | Egozy | A63F 13/005 463/35 |
| 2010/0099473 | A1* | 4/2010 | Ikejiri | A63B 69/36 463/3 |
| 2010/0184498 | A1 | 7/2010 | Takahashi et al. | |
| 2012/0196678 | A1 | 8/2012 | Fujisawa et al. | |
| 2012/0309480 | A1 | 12/2012 | Kashitani | |
| 2013/0109472 | A1 | 5/2013 | Tabata | |

OTHER PUBLICATIONS

Dengeki Playsation, Japan, MediaWorks Inc., vol. 10, No. 12, pp. 50-53 (Apr. 23, 2004), along with a partial English language translation thereof.

Office Action from Japan Patent Office (JPO) in Japanese Patent Application No. 2012-149942, dated Dec. 17, 2013, along with an English language translation thereof.

Office Action from Japan Patent Office (JPO) in Japanese Patent Application No. 2012-149942, dated May 13, 2014, along with a partial English language translation thereof.

"PlayStaion R. Perfect Attack Series, 96, Super Robot Wars F Final Part, Attacking Method for Victory", Futabasha Publishers, pp. 22-23 (Jul. 10, 2000), along with a partial English language translation thereof.

Office Action from Japan Patent Office (JPO) in Japanese Patent Appl. No. 2014-181795, dated Jan. 12, 2016, together with an English language translation.

U.S. Appl. No. 13/977,191 to Tomoya Asano et al., filed Jun. 28, 2013.

* cited by examiner

FIG. 4

| 31 PHYSICAL STRENGTH VALUE | 32 MAGIC POWER VALUE | 33 STANDARD OFFENSIVE POWER | 34 DEFENSIVE POWER | 35 AGILITY | 36 UNCONTROLL-ABILITY PARAMETER | 37 CONTROLLING CONDITION | 38 DEFENDING FLAG |
|---|---|---|---|---|---|---|---|
| 55 | 42 | 24 | 18 | 17 | 15 | Lv4 | 0 |

| CONTROLLING CONDITION | COEFFICIENT |
|---|---|
| Lv1 | 2.5 |
| Lv2 | 1.8 |
| Lv3 | 1.3 |
| Lv4 | 1 |

FIG. 8

| CONTROLLING CONDITION 37 | SPECIAL SKILL 51 |
|---|---|
| Lv4 | HEALING MAGIC 1 |
| Lv3 | SPECIAL ATTACK 1 |
| Lv2 | SPECIAL ATTACK 2 |

50

GAME APPARATUS

CROSS REFERENCE TO RELATED APPLICATION

The present disclosure relates to subject matter contained in Japanese Patent Application No. 2012-149942, filed on Jul. 3, 2012, the disclosure of which is expressly incorporated herein by reference in its entirety.

BACKGROUND OF THE INVENTION

1. Field of the Invention

The present invention relates to a game apparatus in which a game progresses by a player character doing a virtual battle with an enemy character.

2. Description of the Related Art

Conventionally, a Role-Playing Game (RPG) is enjoyed that progresses by allowing a player character operated by a player to move on a field map to clear various challenges. In the RPG, the player character battles with an enemy character and by the player character winning this battle, the player character gains an experience value, etc., thereby grows up. In the battle between the player character and the enemy character, it is common, for example, to perform a parameter computation based on statuses preowned by the respective characters such as the offensive power of the player character and the defensive power of the enemy character, as a result of which the level of damage received by the enemy character is decided.

Meanwhile, in an RPG, the game progresses with a player mainly operating a human model player character. For example, a battle with an enemy character is done by the human model player character and a monster model character cooperating with each other. For example, there is disclosure where when a player character which is a main character wins a battle with an enemy character (monster), the player character catches the enemy character and makes the enemy character as his/her companion (see, for example, JP 2009-240659 A).

However, in a conventional game such as an RPG, the result of attack of a player character is decided based on statuses preowned by respective characters such as the offensive power of the player character and the defensive power of an enemy character. Thus, for damage received by the enemy character, a difference in result by a player's operation does not occur, and the variation width of damage that can be done is not so large, resulting in the lack of sufficient entertainment.

In addition, in a game such as that described in JP 2009-240659 A, a monster model subcharacter having become a companion normally obediently follows a player's instruction or plan. Thus, unless a status abnormality occurs such as going into a panic, the subcharacter does not take disadvantageous action to the player such as attacking the player character. Hence, the game is not such that adventure progresses while the player feels difficulty in manipulating a character such as a monster, and thus, the player does not feel the sense of realism or tension, such as not knowing when the monster goes berserk and launches an attack on the player character.

SUMMARY OF THE INVENTION

The present invention is made to solve such problems, and an object of the present invention is to provide a game apparatus with a lot of interest in which the variation width of a computation result in a battle between a player character and an enemy character is increased, and a difference in result can be brought about even with the same attack by a player's operation.

In addition, another object of the present invention is to provide a game apparatus with a lot of interest in which adventure can progress while a player feels difficulty in manipulating a character such as a monster, and the player can play a game while he/she feels the sense of realism and tension where he/she manipulates the character that is difficult to manipulate as intended.

The present invention relates to a game apparatus comprising a display device and an input device, in which a game progresses by a player character doing a virtual battle with an enemy character, the player character being a subject for operation performed by a player, the game apparatus comprising: a parameter changer that changes a parameter for specifying a status of the player character, according to an operating instruction provided to the input device by the player; a status specifier that specifies the status of the player character, based on the parameter changed by the parameter changer; and a game progresser that allows the game to progress according to the status of the player character specified by the status specifier.

By thus changing a parameter for specifying a status of a player character according to an operating instruction provided to the input device by the player, and specifying the status of the player character based on the changed parameter, the status of the player character can be changed like the principle of leverage. As a result, the variation width of a computation result obtained at a battle can be increased.

In the present invention, it is preferable that the status specifier specifies the status of the player character, based on a magnitude relation between the parameter and at least one provided predetermined threshold.

By thus specifying the status of the player character based on the magnitude relation between the parameter for specifying the status of the player character which changes according to an operating instruction provided to the input device by the player, and a predetermined threshold, the variation width of a computation result obtained at a battle can be increased without performing complex computations.

In the present invention, it is preferable that the game apparatus further comprises a parameter displayer that displays the parameter on a display screen of the display device, using a gauge divided into a plurality of zones, wherein the zones divide the gauge at locations corresponding to the predetermined thresholds.

By thus displaying the parameter using a gauge divided into a plurality of zones, the player can relatively easily grasp the condition of the status of the player character.

In the present invention, it is preferable that the game apparatus further comprises a threshold determiner that determines the predetermined threshold, according to an item owned or carried by the player character or a second player character being a companion of the player character.

By thus determining the threshold according to an item owned or carried by the player character, the player can control how to change the status of the player character for when the player inputs an operating instruction for the parameter, therefore the interest of the game can be improved.

In the present invention, it is preferable that the game apparatus further comprises a disadvantageous action executer that allows the player character to execute disadvantageous action in terms of progress of the game, when the parameter is larger than a predetermined threshold.

By thus allowing the player character to execute disadvantageous action in terms of the progress of the game, such as the player character going into berserk status, resulting in a state in which the player cannot control the player character, when the parameter becomes larger than a predetermined threshold, the player can play the game while having the sense of realism and tension, such as not knowing when a monster that is on the player character's side goes berserk and launches an attack on the player character.

In particular, when a status such as the offensive power of the player character improves as the value of the parameter increases, while the player performs an operation to increase the value of the parameter as much as possible to exploit the player character's potential to its fullest, there is a need for the player to perform an operation such that the value of the parameter does not become larger than the predetermined threshold, in order to prevent the player character from going berserk. Since the player needs to manipulate the player character with a higher level of strategy, the interest of the game improves.

The present invention relates to a tangible computer readable medium that stores a game program that causes a computer apparatus comprising a display device and an input device to execute a game in the computer apparatus, the game progressing by a player character doing a virtual battle with an enemy character, the player character being a subject for operation performed by a player, the game program causing the computer apparatus to function as: a parameter changer that changes a parameter for specifying a status of the player character, according to an operating instruction provided to the input device by the player; a status specifier that specifies the status of the player character, based on the parameter changed by the parameter changer; and a game progresser that allows the game to progress according to the status of the player character specified by the status specifier.

The present invention relates to a game progress method performed by a game apparatus comprising a display device and an input device, in which a game progresses by a player character doing a virtual battle with an enemy character, the player character being a subject for operation performed by a player, the game progress method comprising the steps of: changing, by the game apparatus, a parameter for specifying a status of the player character, according to an operating instruction provided to the input device by the player; specifying, by the game apparatus, the status of the player character, based on the changed parameter; and allowing, by the game apparatus, the game to progress according to the specified status of the player character.

BRIEF DESCRIPTION OF THE DRAWINGS

FIG. 4 is a diagram showing an example of a player character management table set in the game apparatus according to the embodiment of the present invention;

FIG. 5 is a diagram showing the relation between a coefficient for calculating offensive power and a controlling condition of a player character in the embodiment of the present invention;

FIG. 8 is a diagram showing an example of a special skill management table set in the game apparatus according to the embodiment of the present invention.

DETAILED DESCRIPTION OF EMBODIMENTS

A game apparatus of the present invention will be described. The game apparatus of the present invention is not particularly limited, and a portable terminal such as a smartphone, a mobile phone, or a portable dedicated game machine, a stationary game apparatus, or the like, can be used. In the present embodiment, the case in which a smartphone is adopted as the game apparatus will be described.

Figure 1:
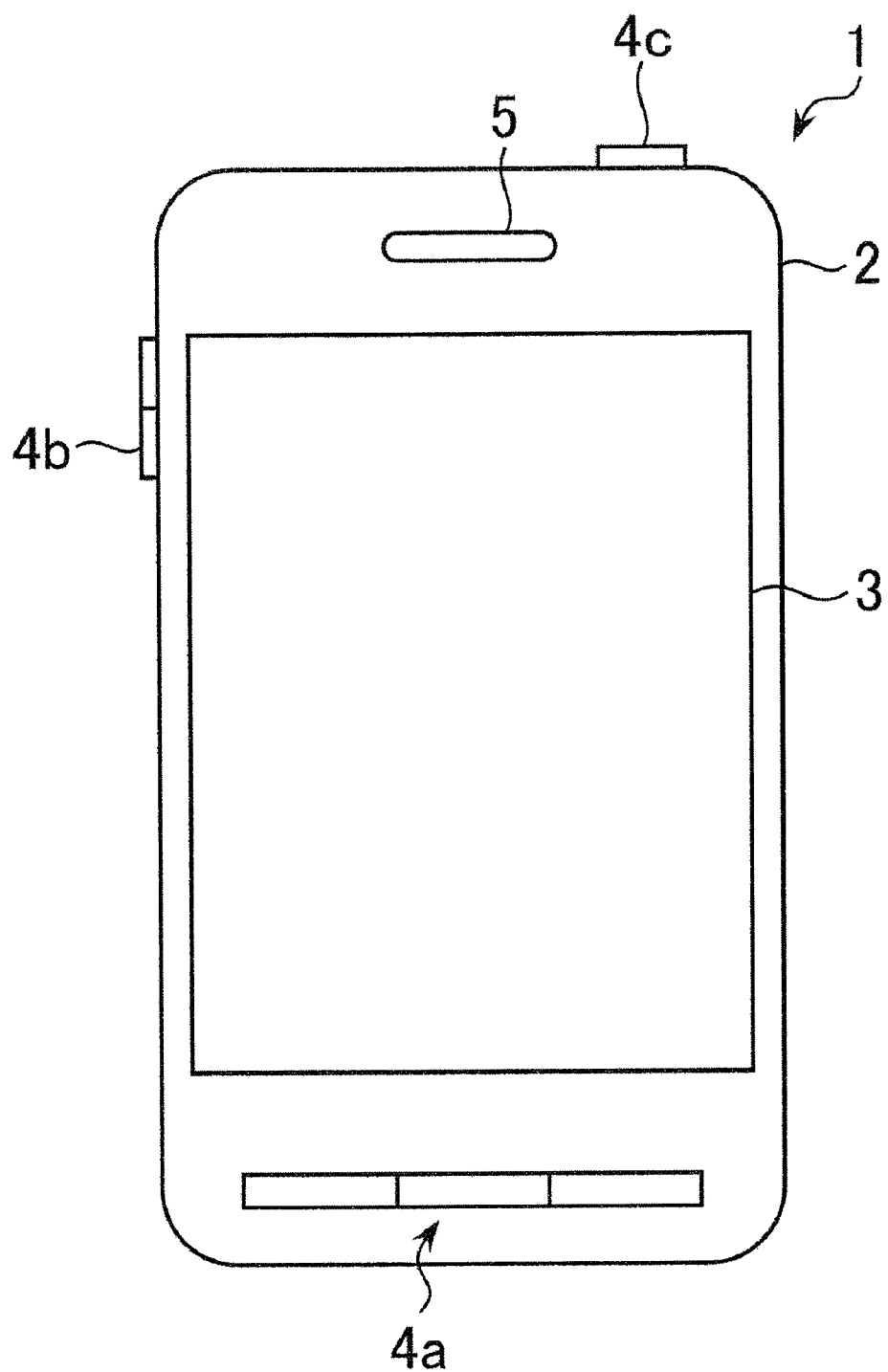
FIG. 1 is an external front view of a game apparatus according to an embodiment of the present invention.

FIG. 1 is an external front view of a game apparatus according to an embodiment of the present invention. A game apparatus 1 includes a main body 2, a liquid crystal monitor 3, an input section 4, and a speaker 5. The liquid crystal monitor 3 is provided at the center of the front side of the main body 2 in a substantially rectangular shape. The liquid crystal monitor 3 is of a touch panel type. By touching the surface of the touch panel with a finger or touch pen, the touch location can be detected by a touch input detecting section. A player can allow a game to progress by performing an operation on the touch panel to change an uncontrollability parameter which will be described later.

The input section 4 includes menu buttons 4a, volume buttons 4b, and a power button 4c. The menu buttons 4a are provided below the liquid crystal monitor 3 of the main body 2. By pressing the menu buttons 4a, a menu screen for performing various settings of the game apparatus 1 can be read. The volume buttons 4b are provided on an upper part of the side of the main body 2. Volume can be adjusted by the volume buttons 4b. The power button 4c is provided on the top side of the main body 2. By pressing the power button 4c, the power to the game apparatus 1 is switched to ON or OFF or the game apparatus 1 can be switched to sleep state. The speaker 5 is built in to the main body 2. An output opening of the speaker 5 is provided above the liquid crystal monitor 3 of the main body 2.

Figure 2:
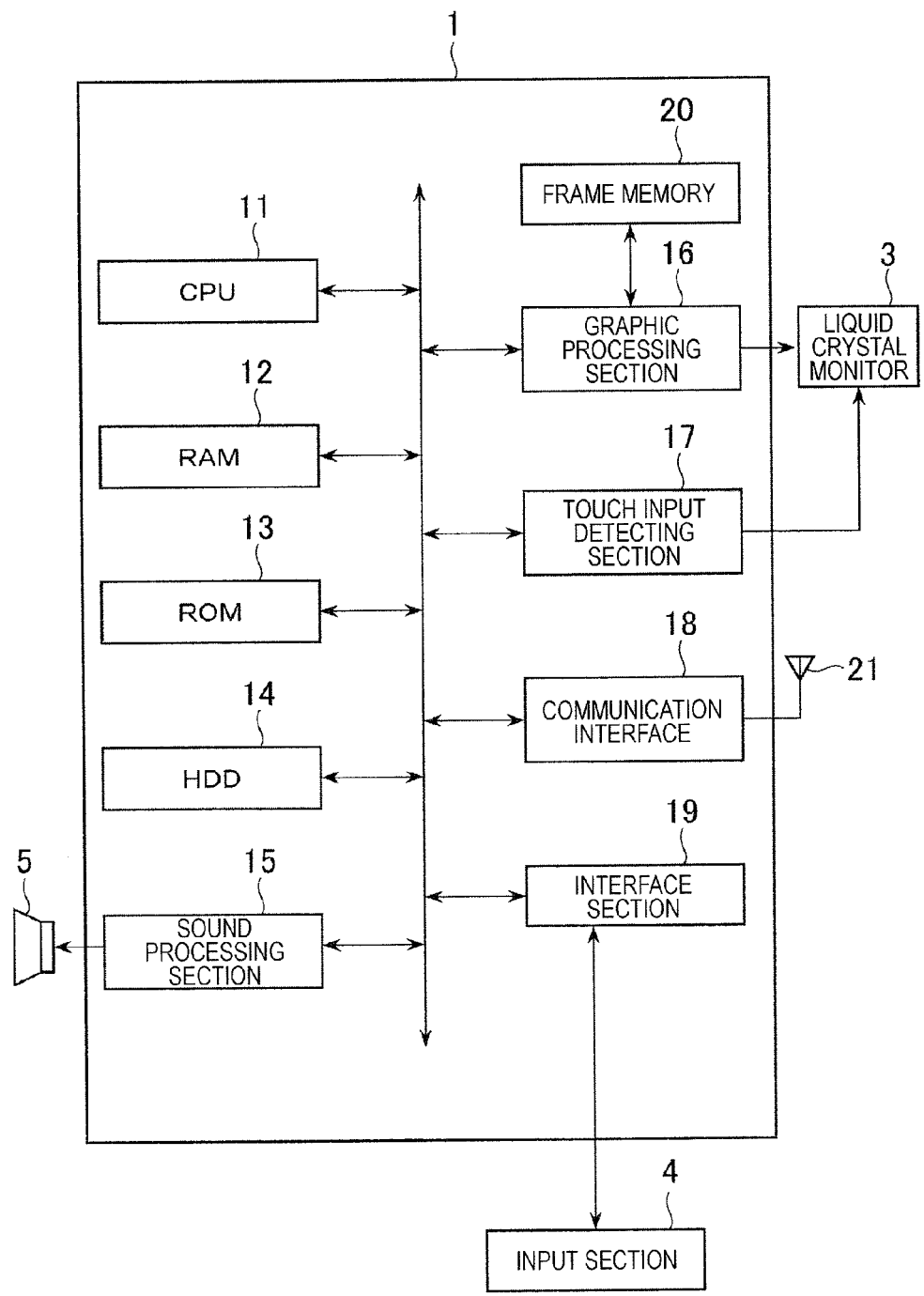
FIG. 2 is a block diagram showing a configuration of the game apparatus according to the embodiment of the present invention.

FIG. 2 is a block diagram showing a configuration of the game apparatus according to the embodiment of the present invention. The game apparatus 1 includes a CPU (Central Processing Unit) 11, a RAM (Random Access Memory) 12, a ROM 13, an HDD 14, a sound processing section 15, a graphic processing section 16, a touch input detecting section 17, a communication interface 18, and an interface section 19, which are connected to each other by an internal bus.

The CPU 11 executes a game program stored in the ROM 13 and performs control of the game apparatus 1. In addition, the CPU 11 includes an internal timer that keeps time. The RAM 12 is a working area of the CPU 11. The HDD 14 is a storage area for saving programs and data.

The CPU 11 performs a process by reading a program and data necessary for a game to progress from the ROM 13. The CPU 11 processes the program and data loaded into the RAM 12, and thereby outputs a sound output instruction to the sound processing section 15 and outputs a rendering command to the graphic processing section 16.

The sound processing section 15 is connected to the speaker 5. When the CPU 11 outputs a sound output instruction to the sound processing section 15, the sound processing section 15 outputs a sound signal to the speaker 5.

The graphic processing section 16 is connected to the liquid crystal monitor 3. When the CPU 11 outputs a rendering command to the graphic processing section 16, the graphic processing section 16 expands an image in a frame memory (frame buffer) 20 and outputs a video signal for displaying the image on the liquid crystal monitor 3. The graphic processing section 16 performs rendering of a single image in units of frames. One frame time of an image is, for example, 1/30 second.

The input section 4 is connected to the interface section 19. Input information by the player from the input section 4 and the touch input detecting section 17 is stored in the RAM 12. The CPU 11 performs various computation processes based on the input information.

The communication interface 18 is wirelessly connected to a communication network. In addition, the communication interface 18 wirelessly performs communication with other game apparatuses 1 through a communication unit having an antenna 21 to transmit game information, etc.

In the present embodiment, the case will be described in which the present invention is applied to a game in which a human model player character (hereinafter, referred to as the main character) rides on the back of a dragon model player character (hereinafter, referred to as the dragon) and manipulates the dragon using a chain connected to the dragon. The game progresses by the dragon, which is manipulated by the main character, doing a battle with an enemy character.

Figure 3:
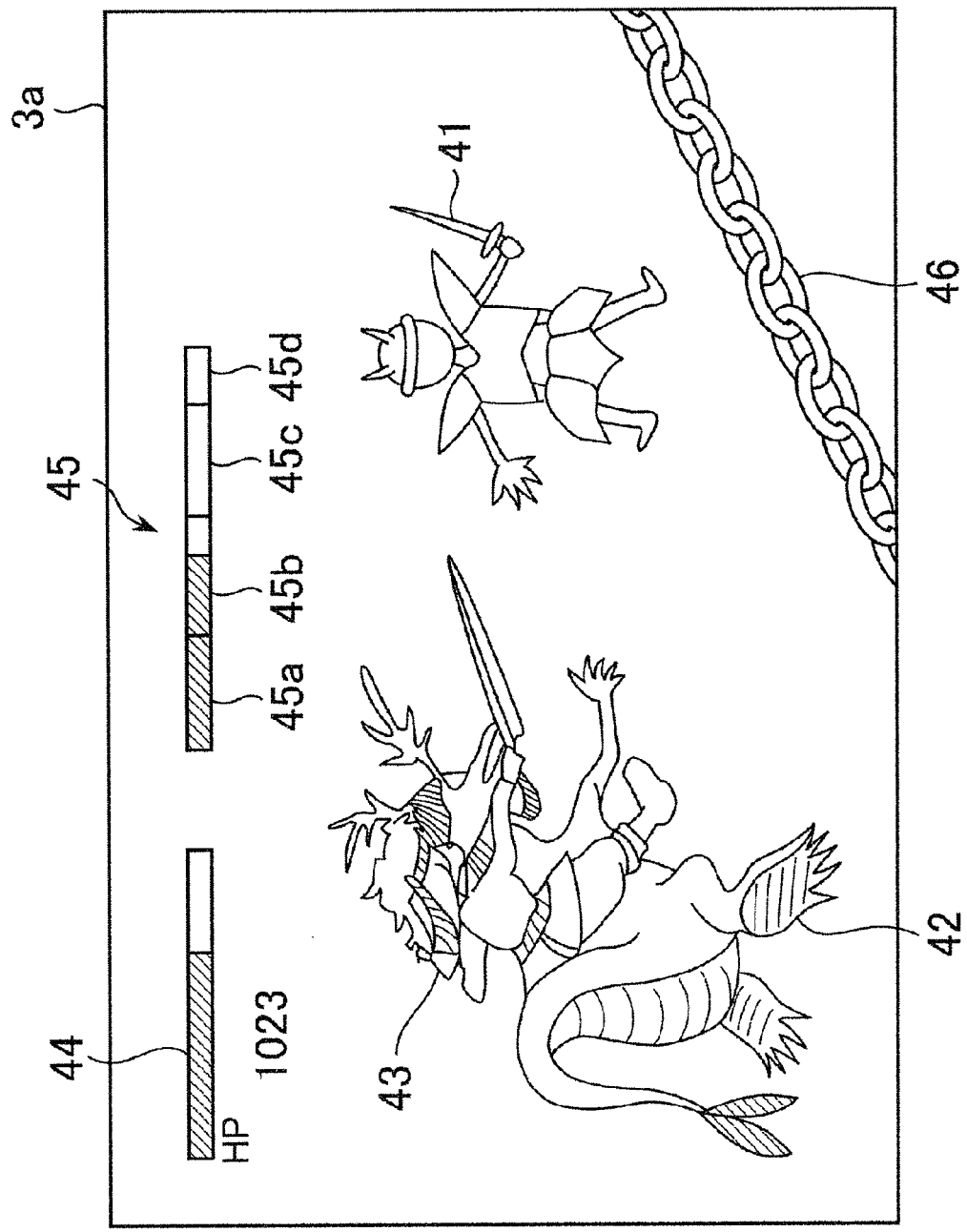
FIG. 3 is a diagram showing an example of a display screen of the game apparatus according to the embodiment of the present invention.

FIG. 3 is an example of a display screen of the game apparatus according to the embodiment of the present invention. On a display screen 3a is displayed a scene where a dragon 42 and a main character 43 riding on the back of the dragon 42 are doing a virtual battle with an enemy character 41, facing the enemy character 41. A hit point display gauge 44 that displays the physical strength value (hit points) of the player character is displayed on the upper left of the display screen 3a.

In addition, a controllability parameter display gauge 45 that displays the value of a controllability parameter which will be described later is displayed on the upper center of the display screen 3a. The controllability parameter display gauge 45 is divided into a blue zone 45a, a green zone 45b, a yellow zone 45c, and a red zone 45d. In the controllability parameter display gauge 45 of FIG. 3, the controllability parameter belongs to the green zone 45b.

A chain 46 is displayed on the lower right of the display screen 3a. The chain 46 represents a chain that is connected to the dragon 42 to manipulate the dragon 42 by the main character 43. In this game, the player manipulates the dragon 42 by loosening or tightening the chain 46 by performing a flick operation on the touch panel of the liquid crystal panel 3. The control level of the dragon 42 is represented by an uncontrollability parameter. A status such as the offensive power of the dragon 42 changes according to the uncontrollability parameter. For example, when the chain 46 is loosened by a player's operation, the value of the uncontrollability parameter increases and thus the offensive power of the dragon 42 gets stronger and approaches berserk status. On the other hand, when the chain 46 is tightened by a player's operation, the value of the uncontrollability parameter decreases and thus the offensive power of the dragon 42 is weakened and approaches stable status.

Various statuses of the dragon 42 are managed by a player character management table which is set in the RAM 12. FIG. 4 is an example of the player character management table set in the game apparatus according to the embodiment of the present invention. A player character management table 30 stores a physical strength value (hit points) 31, a magic power value (magic points) 32, standard offensive power 33, defensive power 34, agility 35, an uncontrollability parameter 36, a controlling condition 37, and a defending flag 38 of the dragon 42.

The standard offensive power 33 of the dragon 42 is a standard value for specifying offensive power for when the dragon 42 does a normal attack on the enemy character 41. The offensive power is specified by multiplying the standard offensive power 33 by a predetermined coefficient according to the controlling condition 37. The controlling condition 37 specifies a level at which the player is able to control the dragon 42. The controlling condition 37 is divided into levels 1 to 4 and is decided based on the uncontrollability parameter 36.

For example, when the uncontrollability parameter 36 is in the range of 1 to 30, the controlling condition 37 is at level 4 which is the highest level. When the uncontrollability parameter 36 is in the range of 30 to 60 (not including 30), the controlling condition 37 is at level 3. When the uncontrollability parameter 36 is in the range of 60 to 90 (not including 60), the controlling condition 37 is at level 2. When the uncontrollability parameter 36 is greater than 90, the controlling condition 37 is at level 1. In this case, the uncontrollability parameters "30", "60," and "90" serve as thresholds that divide the controlling condition 37.

The uncontrollability parameter 36 is displayed on the controllability parameter display gauge 45 on the display screen 3a of the liquid crystal monitor 3. The controllability parameter display gauge 45 is divided into a plurality of zones, the blue zone 45a, the green zone 45b, the yellow zone 45c, and the red zone 45d. Levels 4 to 1 of the controlling condition 37 correspond to the blue zone 45a, the green zone 45b, the yellow zone 45c, and the red zone 45d, respectively. Therefore, as the value of the uncontrollability parameter 36 increases, the controlling condition 37 changes in order from level 4 to level 1. Note that a special skill that can be used by the dragon 42 is decided according to which level the controlling condition 37 belongs to.

When the controlling condition 37 belongs to the blue zone 45a (level 4), the offensive power for when the dragon 42 attacks the enemy character 41, based on which damage to the enemy character 41 is calculated, is the same as the standard offensive power 33. As shown in FIG. 5, the coefficient by which the standard offensive power 33 is multiplied to calculate offensive power is "1". When the controlling condition 37 is at level 4, a special skill that can be used by the dragon 42 is a healing magic/healing skill that can recover the physical strength value 31 of the dragon 42, or a support magic/support skill that can improve the defensive power 34 or agility 35 of the dragon 42. Even if the value of the uncontrollability parameter 36 belongs to the blue zone 45a, when the value of the uncontrollability parameter 36 increases and exceeds a predetermined threshold, the controlling condition 37 results in belonging to the green zone 45b.

When the controlling condition 37 is in the green zone 45b (level 3), the offensive power of the dragon 42 for when the dragon 42 attacks the enemy character 41 is higher than the standard offensive power 33. Specifically, as shown in FIG. 5, the offensive power is calculated by multiplying the standard offensive power 33 by a predetermined coefficient larger than 1. When the controlling condition 37 belongs to the green zone 45b, a special skill used by the dragon 42 is an attack magic/attack skill for attacking the enemy character 41. When the controlling condition 37 belongs to the green zone 45b, a healing magic/healing skill cannot be used. Thus, to use a healing magic or a support magic, there is a need to reduce the uncontrollability parameter 36 of the dragon 42 by performing an operation on the touch panel. Even if the value of the uncontrollability parameter 36 belongs to the green zone 45b, when the value of the uncontrollability parameter 36 increases and exceeds a predetermined threshold, the controlling condition 37 results in belonging to the yellow zone 45c.

When the controlling condition 37 is in the yellow zone 45c (level 2), the offensive power of the dragon 42 for when the dragon 42 attacks the enemy character 41 is higher than the standard offensive power 33 and is still higher than that of the case in which the controlling condition 37 is in the green zone 45b. Specifically, the offensive power is calculated by multiplying the standard offensive power 33 by a predetermined coefficient larger than 1. Therefore, the value of the coefficient by which the standard offensive power 33 is multiplied is larger in the case of the yellow zone 45c than the case of the green zone 45b.

A special skill that can be used by the dragon 42 when the controlling condition 37 is in the yellow zone 45c is an attack magic/attack skill for attacking the enemy character 41. The attack magic/attack skill used when the controlling condition 37 belongs to the yellow zone 45c is more powerful than the attack magic/attack skill used when the controlling condition 37 belongs to the green zone 45b and thus more damage can be done to the enemy character 41. Even if the controlling condition 37 is in the yellow zone 45c, when the value of the uncontrollability parameter 36 increases and exceeds a predetermined threshold, the controlling condition 37 changes to the red zone 45d.

When the uncontrollability parameter 36 exceeds the predetermined threshold, resulting in the controlling condition 37 belonging to the red zone 45d, the dragon 42 goes into berserk status and thus cannot be controlled by a player's operation on the touch panel. For example, the dragon 42 takes disadvantageous action in terms of the progress of the game, such as going berserk and attacking the main character 43. In this case, the game may be configured such that the dragon 42 attacks the main character 43, going into a state in which the dragon 42 and the main character 43 cannot battle, leading to game over.

Alternatively, when the dragon 42 goes berserk, instead of attacking the main character 43, the dragon 42 may attack the enemy character 41, but at the same time some kind of penalty may be imposed. For example, when the uncontrollability parameter 36 exceeds the predetermined threshold, resulting in the controlling condition 37 belonging to the red zone 45d, the game may be configured such that the standard offensive power 33 is multiplied by a predetermined coefficient larger than 1, by which more powerful offensive power than that of the case of belonging to the green zone 45b or the yellow zone 45c can be obtained, but every time the dragon 42 does an attack, the maximum HP of the dragon 42 decreases. In this case, the player can increase the offensive power of the dragon 42 and thus can give more damage to the enemy character 41 by increasing the uncontrollability parameter 36 to make the controlling condition 37 belong to the red zone 45d; however, the maximum HP decreases and thus it is disadvantageous in terms of the progress of the game.

When the controlling condition 37 is in the red zone 45d and thus the dragon 42 goes into berserk status, those zones displayed as the yellow zone 45c and the green zone 45b so far on the controllability parameter display gauge 45 are displayed also changed to the red zone 45d. Hence, once the uncontrollability parameter 36 has become larger than the predetermined threshold at which the uncontrollability parameter 36 goes into the red zone 45d and the controlling condition 37 has belonged to the red zone 45d, those zones displayed as the yellow zone 45c and the green zone 45b turn into the red zone 45d, and thus, the controllability parameter display gauge 45 only has the blue zone 45a and the red zone 45d.

In this case, to bring the dragon 42 back to normal stable status from berserk status, there is a need to move the value of the uncontrollability parameter 36 to the blue zone 45a by further reducing the uncontrollability parameter 36 than those in the zones displayed as the yellow zone 45c and the green zone 45b so far. That is, once the dragon 42 has gone into berserk status, it takes time to bring the dragon 42 back to normal status. As such, after once the dragon 42 has gone into berserk status, by reducing the value of the uncontrollability parameter 36, the portions of the yellow zone 45c and the green zone 45b that are changed to the red zone 45d return to their original states again.

The uncontrollability parameter 36 can be increased or reduced by a player's operation. For example, in the case of performing an input for the uncontrollability parameter 36 on the touch panel, when a flick operation is performed from the right to the left the uncontrollability parameter 36 increases, and when a flick operation is performed from the left to the right the uncontrollability parameter 36 decreases.

In addition, the uncontrollability parameter 36 can be changed by other elements than a player's operation on the touch panel. For example, the configuration may be such that the uncontrollability parameter 36 increases automatically as time passes, or such that every time the dragon 42 succeeds in attacking the enemy character 41 or every time the dragon 42 is attacked by the enemy character 41, the uncontrollability parameter 36 increases.

In the game apparatus of the present invention, the controllability parameter display gauge 45 is divided into the blue zone 45a, the green zone 45b, the yellow zone 45c, and the red zone 45d. Every time the value of the uncontrollability parameter 36 exceeds a threshold set for each zone, a status such as the offensive power of the player character changes and thus a magic or skill that can be used also changes. The thresholds that divide the controllability parameter display gauge 45 into the respective zones may be fixed, but can also be determined according to, for example, the level of the player character (the dragon 42 or the main character 43) or the item owned or carried by the player character.

Figure 6:
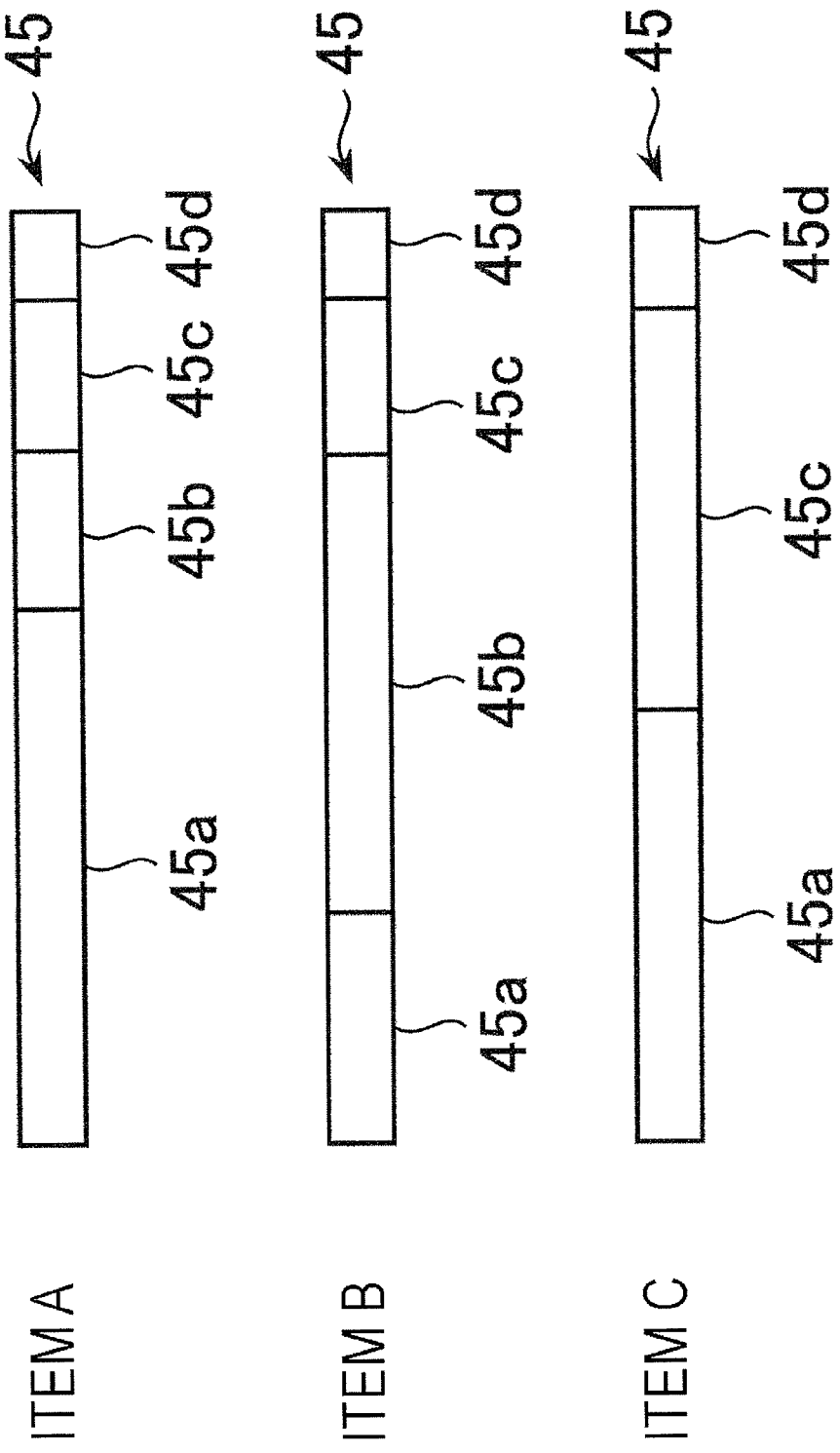
FIG. 6 is a diagram showing the relation between items and a controllability parameter display gauge in the embodiment of the present invention.

Therefore, the division of the controllability parameter display gauge 45 is decided according to the owned or carried item, e.g., when the player character owns or carries item A, as shown in FIG. 6, the blue zone 45a is the longest and the green zone 45b and the yellow zone 45c are short, and when the player character owns or carries item B, the blue zone 45a and the yellow zone 45c are short and the green zone 45b is long. When the player character owns or carries item C, the controllability parameter display gauge 45 may only include the blue zone 45a, the yellow zone 45c, and the red zone 45d without the green zone 45b. Although the length of the gauge where all zones are put together is normally fixed, the configuration may be such that the length of the controllability parameter display gauge 45 changes according to the level of the player character or the item owned or carried by the player character.

Figure 7:
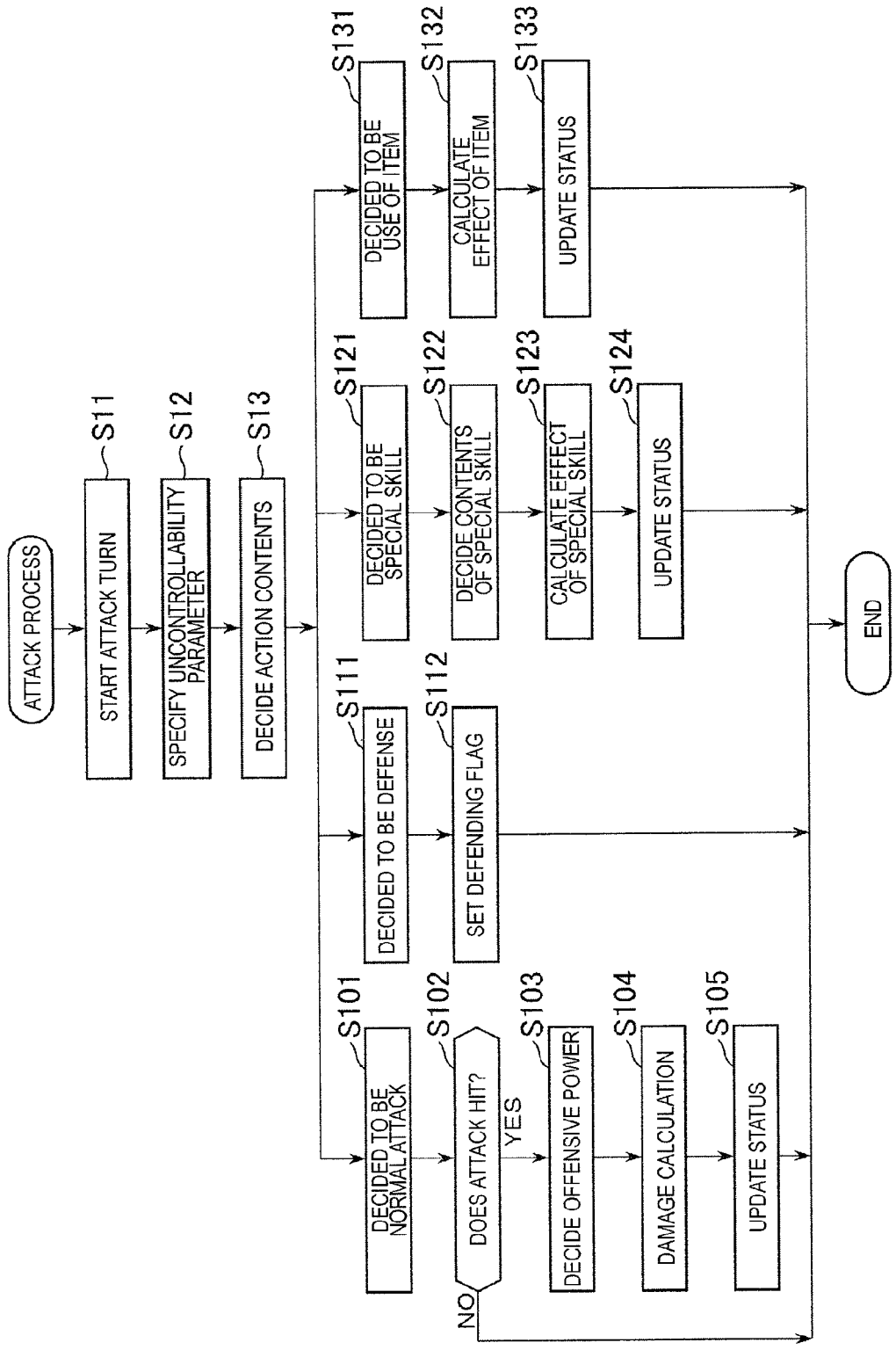
FIG. 7 is a diagram showing a flowchart of an attack process in a virtual battle in the embodiment of the present invention.

Next, a process performed when a player character takes action in a virtual battle, e.g., the player character attacks an enemy character or defends itself against the enemy character, will be described. FIG. 7 is a diagram showing a flowchart of an attack process in a virtual battle on the game apparatus according to the embodiment of the present invention. A virtual battle between a player character and an enemy character begins when the player character and the enemy character run into each other on a field map. The virtual battle is turn-based. Each of the player character and the enemy character can take any of actions including a normal attack, defense, a special skill, and use of an item, a predetermined number of times per turn. A decision as to in what order the player character and the enemy character do attacks in each turn is made based on the agility 35 of each character.

When the attack turn of the player character starts (step S11), an uncontrollability parameter 36 for when the attack turn of the player character starts is specified (step S12). Then, the action contents of the player character are decided based on the uncontrollability parameter 36 or a controlling condition 37 (step S13).

Which one of the actions including a normal attack, defense, a special skill, and use of an item the player character takes is automatically specified according to a predetermined probability. In this case, the predetermined probability may change according to the value of the uncontrollability parameter 36. For example, when the controllability parameter display gauge 45 belongs to the blue zone 45*a*, the normal attack is 50%, the defense is 25%, the special skill is 15%, and the use of an item is 10%, and when the controllability parameter display gauge 45 belongs to the green zone 45*b*, the normal attack is 55%, the defense is 15%, the special skill is 20%, and the use of an item is 10%. Alternatively, instead of automatically specifying the action contents of the player character, the player may select action contents.

When the action contents of the player character are decided to be "normal attack" (step S101), whether the normal attack of the player character hits the enemy character is decided randomly based on the agility 35 of the player character, the agility of the enemy character, the evasion ratio of the enemy character, etc. (step S102). If it is decided that the normal attack of the player character does not hit the enemy character (NO at step S102), then the attack process for this attack turn ends.

If it is decided that the normal attack of the player character hits the enemy character (YES at step S102), then the offensive power of the player character is decided based on the coefficient associated with the controlling condition 37 and the standard offensive power 33 (step S103). The offensive power of the player character is specified by multiplying the standard offensive power 33 of the player character by a predetermined coefficient. The predetermined coefficient changes according to the controlling condition 37 of the player character. As shown in FIG. 5, when the uncontrollability parameter 36 belongs to the blue zone 45*a*, the coefficient by which the standard offensive power 33 is multiplied is "1". The value of the coefficient becomes larger than "1" in the order of the green zone 45*b*, the yellow zone 45*c*, and the red zone 45*d*.

When the offensive power of the player character is decided at step S103, the level of damage received by the enemy character is calculated (step S104). The damage received by the enemy character is decided randomly based on the offensive power of the player character and the defensive power of the enemy character. When the damage received by the enemy character is decided, the physical strength value of the enemy character stored in a table which manages the enemy character is updated (step S105), and the process for this attack turn ends.

When the action contents of the player character are decided to be "defense" (step S111), a defending flag 38 is set in a player character management table 30 which manages the player character (step S112), and the process for this attack turn ends. Note that when the player character is attacked by the enemy character while the defending flag 38 is set, the damage received by the player character is halved. Note that the set defending flag 38 is reset at the point in time when all of the actions of the player character and the enemy character in this turn are done.

When the action contents of the player character are decided to be "special skill" (step S121), the contents of a special skill 51 to be executed are decided referring to a special skill management table 50 set in the RAM 12, such as that shown in FIG. 8 (step S122).

In the special skill management table 50, usable special skills 51 are set for each zone to which the uncontrollability parameter 36 belongs, i.e., for each controlling condition 37. When the uncontrollability parameter 36 belongs to the blue zone 45*a*, "healing magic 1" can be used, and when belonging to the green zone 45*b*, "special attack 1" can be used. The special skills 51 stored in the special skill management table 50 can also be set beforehand by the player on a menu screen, etc. For example, when the controlling condition 37 is in the blue zone 45*a*, a healing magic and a support magic can be set, and furthermore, the player can select which one of the healing magic and the support magic to set.

According to the contents of the special skill 51 decided at step S122, the effect thereof is calculated (e.g., in the case of the healing magic the amount of recovery of the physical strength value of the player character is calculated, and in the case of the attack magic the level of damage received by the enemy character is calculated) (step S123). When the effect of the special skill 51 is calculated, a status such as the physical strength value of the player character or the enemy character is updated by addition or subtraction according to the effect of the special skill 51 (step S124), and the process for this attack turn ends.

When the action contents of the player character are decided to be "use of an item" (step S131), the effect according to the used item is calculated (step S132). Then, according to the effect of the item, a status such as the physical strength value or magic power value of the player character or the enemy character is updated (step S133), and the process for this attack turn ends.

Every time an attack turn of the player character comes around, a series of these attack processes are performed and continue until the physical strength value 31 of the player character reaches zero, going into a state in which the player character cannot battle, or until the physical strength value of the enemy character reaches zero, going into a state in which the enemy character cannot battle, or until either the player character or the enemy character runs away and withdraws from the battle.

Figure 9:
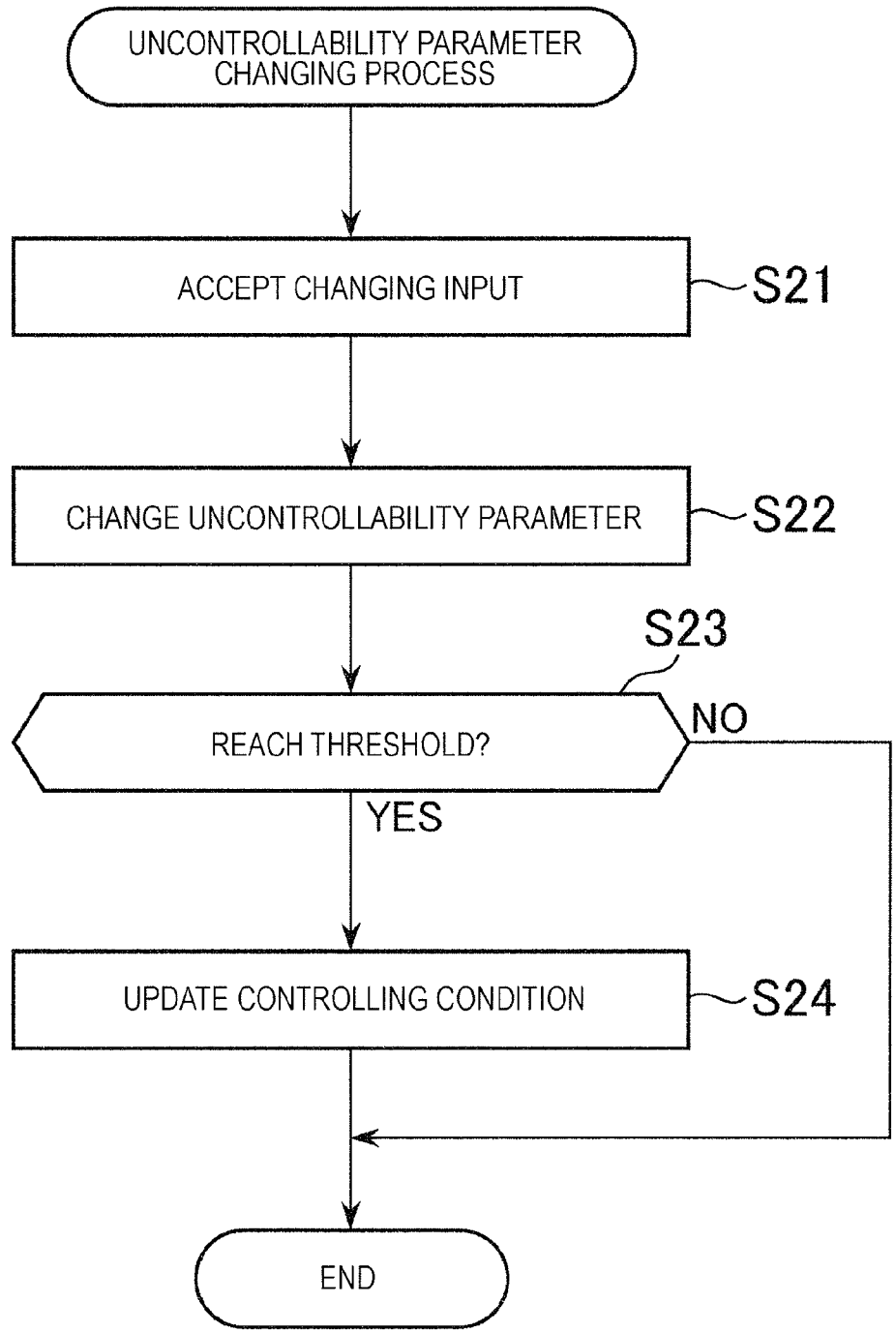
FIG. 9 is a diagram showing a flowchart of an uncontrollability parameter changing process in the embodiment of the present invention.

Next, the changing process of an uncontrollability parameter 36 will be described. FIG. 9 is a diagram showing a flowchart of an uncontrollability parameter changing process which is performed by the game apparatus according to the embodiment of the present invention. First, by a player's operation on the touch panel, a changing input for an uncontrollability parameter 36 is accepted (step S21), and the uncontrollability parameter 36 is changed (step S22).

For example, in the case in which the longitudinal direction of the touch panel is a horizontal direction and the transverse direction is a vertical direction, when a flick operation is performed on the touch panel in the right direction from the left side, the uncontrollability parameter 36 increases and thus the player character becomes more offensive, resulting in a state in which the player character is difficult to control. When a flick operation is performed on the touch panel in the left direction from the right side, the uncontrollability parameter 36 decreases and thus the player character becomes more defensive, resulting in a state in which the player character is easy to control.

For example, in a game in which the dragon 42 serving as a player character is connected by the chain 46 and is allowed to battle with the enemy character 41, when a flick operation is performed on the touch panel in the right direction from the left side, the chain 46 is loosened and thus the dragon 42 becomes offensive, approaching berserk status. On the other hand, when a flick operation is performed on the touch panel in the left direction from the right side, the chain 46 is tightened and thus the dragon 42 becomes defensive, going into stable status. Note that the amount of change in uncontrollability parameter 36 is determined according to the movement distance in the left/right direction where a finger or the like moves while touching the touch panel during a flick operation.

If the uncontrollability parameter 36 is changed and reaches a threshold at which a controlling condition 37 changes (YES at step S23), then the status of the controlling condition in a player character management table is updated (step S24), and the changing process of the uncontrollability parameter 36 ends. If the uncontrollability parameter 36 does not reach the threshold (NO at step S23), then the series of processes end without changing the controlling condition 37. These processes are performed on a frame-by-frame basis until a virtual battle between the player character and the enemy character ends.

Although in the above-described embodiment the case is described in which the offensive power of the player character is decided according to the change in uncontrollability parameter, the configuration may be such that an increase in uncontrollability parameter not only increases offensive power but also changes defensive power, agility, etc., at the same time. For example, the configuration may be such that when the player character approaches berserk status by an increase in uncontrollability parameter, the offensive power increases but the defensive power decreases, increasing damage to be done to the enemy character; on the other hand, the risk of an increase in damage to be received by the player character also occurs. By such a configuration, the player needs to progress the game by strategically operating the controlling condition of the player character, which improves the interest of the game.

In addition, the configuration may be such that other statuses than offensive power such as the defensive power and agility of the player character are decided according to the change in uncontrollability parameter. For example, the configuration may be such that as the player character approaches berserk status, the speed of the player character increases, but the moving direction cannot be controlled.

In addition, the types of status influenced by the change in uncontrollability parameter can be changed according to the type of player character. For example, when the player character is a giant model monster characterized by the level of strength, the offensive power changes according to the change in uncontrollability parameter. When the player character is a bird model monster characterized by agility, the agility changes according to the change in uncontrollability parameter.

Although in the above-described embodiment the application of the present invention to an RPG is mainly described, the present invention can be applied to games of other genres than the RPG. For example, the present invention can also be applied to action games, racing games, etc. For example, in the case of a racing game, a human model character rides on an ostrich model character and the player manipulates the ostrich model character. By reducing an uncontrollability parameter by a player's operation, although the speed of the ostrich model character decreases, the moving direction obediently follows the player's operation. By increasing the uncontrollability parameter, although the speed of the ostrich model character increases, the moving direction is difficult to follow the player's operation.

REFERENCE SIGNS LIST

1 GAME APPARATUS
2 MAIN BODY
3 LIQUID CRYSTAL MONITOR
4 INPUT SECTION
5 SPEAKER
11 CPU
12 RAM
13 ROM
14 HDD
15 SOUND PROCESSING SECTION
16 GRAPHIC PROCESSING SECTION
17 TOUCH INPUT DETECTING SECTION
18 COMMUNICATION INTERFACE
19 INTERFACE SECTION
20 FRAME MEMORY
21 ANTENNA
30 PLAYER CHARACTER MANAGEMENT TABLE
50 SPECIAL SKILL MANAGEMENT TABLE

What is claimed is:

1. A game apparatus for progressing a game in which a player character does a virtual battle with an enemy character, the player character being a subject for operation performed by a player, the game apparatus comprising:
a display;
an input for receiving an operating instruction performed by the player;
a processor; and
a memory including a set of instructions that, when executed by the processor, causes the processor to perform operations including:
determining a predetermined threshold, according to an item owned or carried by the player character or by a second player character being a companion of the player character;
changing a parameter of the player character, according to the operating instruction received by the input from the player;
specifying a status of the player character, based on a magnitude relation between the parameter changed by the changing and the predetermined threshold determined by the determining; and
progressing the game according to the status of the player character specified by the specifying, wherein the player character controls a model character during the virtual battle with the enemy character, and
the operating instruction manipulates the model character by the player character.

2. The game apparatus according to claim 1, wherein the display displays the parameter on a display screen, using a gauge divided into a plurality of zones, wherein
the zones divide the gauge at locations, at least one of the locations corresponding to the predetermined threshold.

3. The game apparatus according to claim 1, wherein the player character executes a disadvantageous action when the parameter is larger than the predetermined threshold.

4. The game apparatus according to claim 1, wherein
the display displays a controllability parameter display gauge that is divided into a plurality of color-coded zones, and
the predetermined threshold separates two of the plurality of color-coded zones.

5. The game apparatus according to claim 1, wherein the operating instruction causes the player character to manipulate the model character, whereby the player character manipulates the object to change the parameter.

6. The game apparatus according to claim 1, wherein the display is a touch panel display and the operating instruction is to the touch panel display, whereby the player operates the touch panel display to change the parameter.

7. The game apparatus according to claim 1, wherein the status of the player character is specified by multiplying a standard status by a predetermined coefficient according to the operating instruction.

8. The game apparatus according to claim 1, wherein an availability of a special skill to the player character is decided according to the status of the player character.

9. The game apparatus according to claim 1, wherein an amount of change of the parameter is determined according to a movement distance of the operating instruction.

10. The game apparatus according to claim 9, wherein
the display is a touch panel display, and
the movement distance of the operation corresponds to a movement distance of a finger on the touch panel display during a flick operation.

11. The game apparatus according to claim 1, wherein
the player character controls the model character during the virtual battle with the enemy character, and
the status of the player character corresponds to an ability of the player character to manipulate the model character during the battle.

12. The game apparatus according to claim 11, wherein an offensive strength of the model character and the status of the player character, which corresponds to the ability of the player character to manipulate the model character during the battle, are inversely proportional.

13. A non-transitory computer readable medium that stores a game program that causes a computer apparatus comprising a display and an input to execute a game in which a player character does a virtual battle with an enemy character, the player character being a subject for operation performed by a player, the game program causing the computer apparatus to perform operations including:
receiving, by the input, an operating instruction performed by the player
determining a predetermined threshold, according to an item owned or carried by the player character or by a second player character being a companion of the player character;
changing a parameter of the player character, according to the operating instruction received by the input from the player;
specifying a status of the player character, based on a magnitude relation between the parameter changed by the changing and the predetermined threshold determined by the determining; and
progressing the game according to the status of the player character specified by the specifying,
wherein the player character controls a model character during the virtual battle with the enemy character, and
the operating instruction manipulates the model character by the player character.

14. A game progress method performed by a game apparatus comprising a display and an input, the game apparatus progressing a game in which a player character does a virtual battle with an enemy character, the player character being a subject for operation performed by a player, the game progress method comprising:
receiving, by the input, an operating instruction performed by the player;
determining, by the game apparatus, a predetermined threshold, according to an item owned or carried by the player character or by a second player character being a companion of the player character;
changing, by the game apparatus, a parameter of the player character, according to the operating instruction received by the input from the player;
specifying, by the game apparatus, a status of the player character, based on a magnitude relation between the changed parameter and the determined predetermined threshold; and
progressing, by the game apparatus, the game according to the specified status of the player character,
wherein the player character controls a model character during the virtual battle with the enemy character, and
the operating instruction manipulates the model character by the player character.

* * * * *